June 8, 1926.
G. H. BENEDICT
1,587,499
EGG PRESERVING APPARATUS
Original Filed Feb. 14, 1922   3 Sheets-Sheet 1
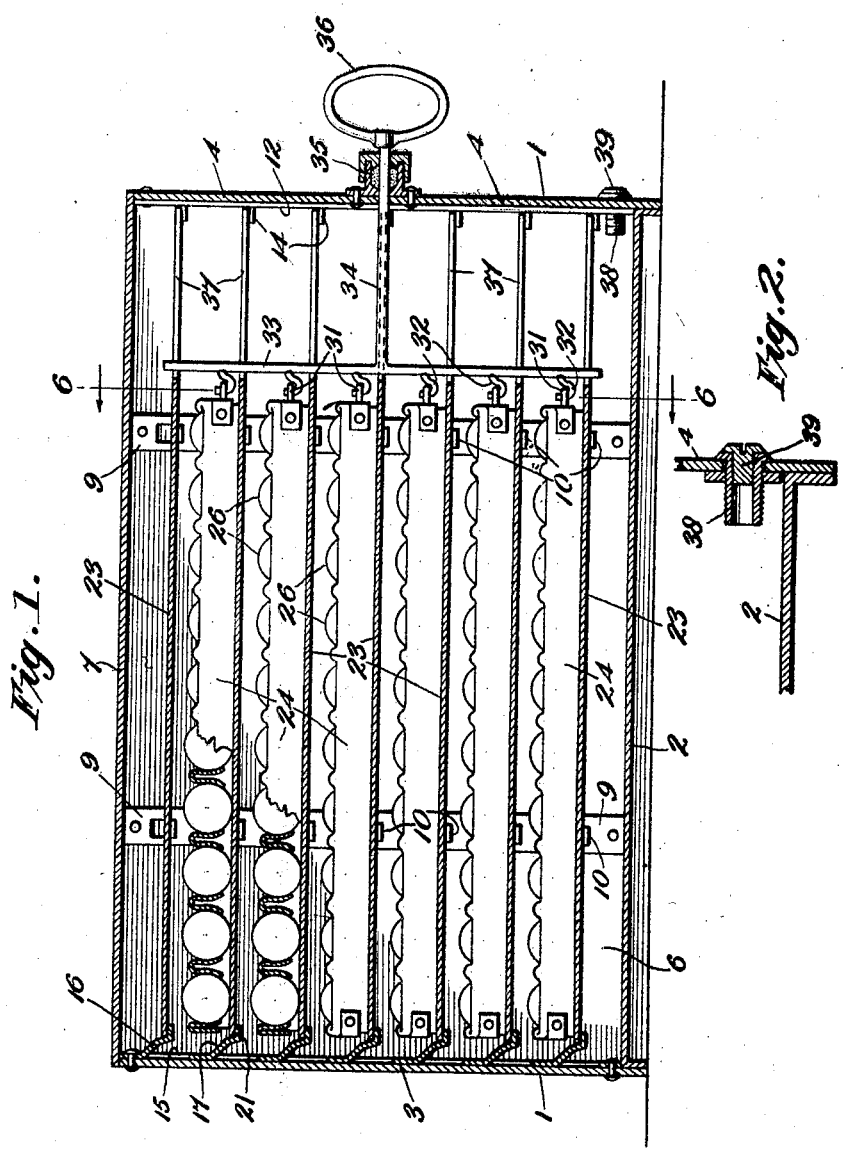
Inventor
Geo. H. Benedict,
By Gross & Collings.
Attorneys

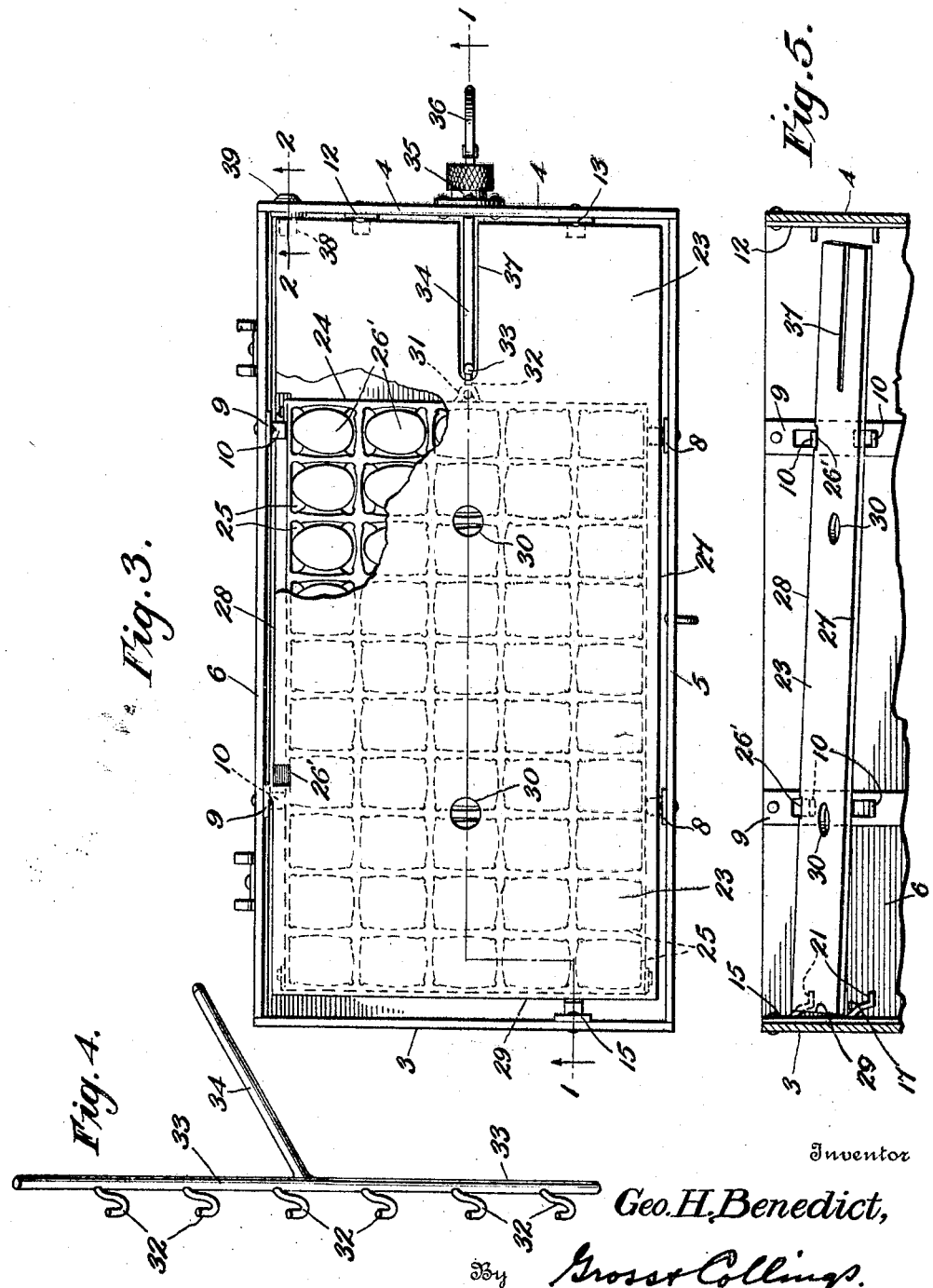

June 8, 1926.
G. H. BENEDICT
1,587,499
EGG PRESERVING APPARATUS
Original Filed Feb. 14, 1922    3 Sheets-Sheet 3
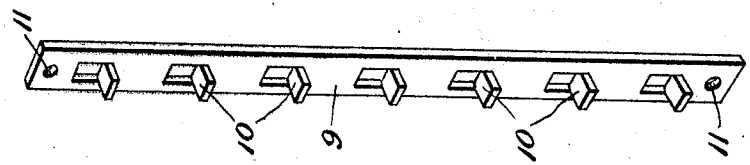
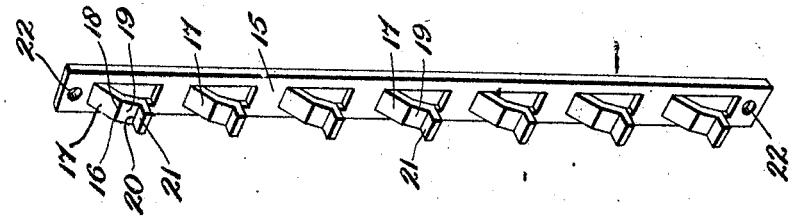
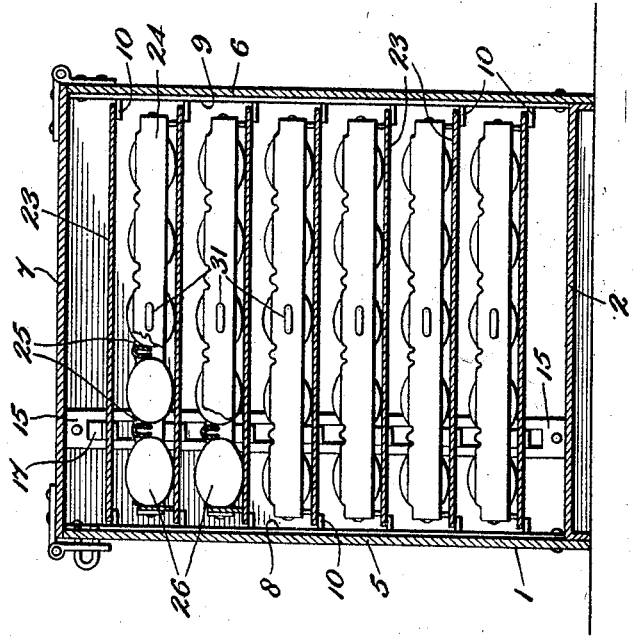
Inventor
Geo. H. Benedict,
By Gross & Collings.
Attorneys Patented June 8, 1926.

1,587,499

UNITED STATES PATENT OFFICE.

GEORGE H. BENEDICT, OF WASHINGTON, DISTRICT OF COLUMBIA, ASSIGNOR, BY MESNE ASSIGNMENTS, TO AMERICAN WAREHOUSE CORP., OF WASHINGTON, DISTRICT OF COLUMBIA, A CORPORATION OF DELAWARE.

EGG-PRESERVING APPARATUS.

Application filed February 14, 1922, Serial No. 536,493. Renewed November 14, 1925.

This invention relates to egg preserving apparatus and has for its object to provide an apparatus of this character which will be simple in construction, comparatively inexpensive to manufacture and more efficient in use than those which have been heretofore proposed.

A further object of the invention is to improve the construction shown in the prior U. S. patent to Ennis M. Nichols, granted May 6, 1919, No. 1,302,955 and entitled Method and apparatus for preserving eggs.

Another object of the invention is to provide an efficient means for moving the said trays longitudinally with respect to the plates, whereby the eggs contained therein may be partially rotated for the purpose above mentioned.

With these and other objects in view which will appear as the description proceeds, the invention consists in the novel details of construction and combinations of parts more fully hereinafter disclosed and particularly pointed out in the claims.

Referring to the accompanying drawings forming a part of the specification, in which like numerals designate like parts in all the views:

Figure 1 is a central vertical sectional view, partly in elevation, of an egg preserving apparatus made in accordance with the present invention;

Fig. 2 is an enlarged fragmentary sectional view taken approximately on line 2—2 of Fig. 3, illustrating the discharge passage for the preserving liquid;

Fig. 3 is a top plan view of the parts shown in Fig. 1, the hinged cover of the container being omitted and a portion of one of the supporting plates being broken away for the sake of clearness;

Fig. 4 is a detail perspective view of a portion of the tray sliding mechanism;

Fig. 5 is a fragmentary vertical sectional view illustrating the method of inserting or removing the supporting plates in the present invention;

Fig. 6 is a transverse vertical sectional view taken approximately on the line 6—6 of Fig. 1, looking in the direction of the arrows;

Fig. 7 is a detail perspective view of one of the plate supporting members; and

Fig. 8 is a view similar to Fig. 7 of another of the plate supporting members.

Referring more especially to Figs. 1, 3 and 6, 1 designates a container of sheet metal or any other suitable material provided with a bottom 2, end walls 3 and 4, side walls 5 and 6, and a hinged top 7. The joints between the various walls are preferably made liquid-tight so that the said container is adapted to hold a suitable preserving solution such for example as a solution of sodium silicate.

The side walls 5 and 6 of the said container 1 are each provided with a pair of vertically extending plate supporting members 8 and 9, which members are preferably composed of sheet metal which has been subjected to die or punching action to strike up portions thereof to form the angularly disposed plate supporting members 10. Said members 8 and 9 are also stamped or drilled as at 11 to accommodate suitable fastening means such as screws, nails, rivets, or the like, whereby they may be secured to the said side walls of the container.

The end wall 4 of the container is also provided with a pair of tray supporting members 12 and 13, spaced substantially as shown, which members may be similar to the members 8 and 9, just described, and provided with plate supporting projections 14, as clearly illustrated in the drawings.

The end member 3 of the container 1 is also provided with a plate supporting member 15 formed of sheet metal which has been subjected to the action of suitable dies to strike out the supporting projections 16. The said projections 16, however, do not extend at right angles to the plate of the member 15 as do the projections 10 of the members 8 and 9; but on the other hand the said projections 16 are provided with portions 17, making an acute angle with the body portion 15. The said projections 16 are further bent as at 18, thus providing another surface 19 which makes an even more acute angle with the body portion 15 than does the portion 17. The supporting projections 16 are further bent as at 20 away from the body portion 15, thus providing a supporting projection 21 which occupies a plane at substantially right angles to the body portion 15. The said body portion 15 may be further stamped or drilled as at 22 to accommodate suitable fastening means, whereby it may be secured to the end wall of the container 1.

Resting upon the supporting projections 10, 14 and 21 of the supporting members 8, 9, 12, 13, 15, are a plurality of plates or shelves 23 of sheet metal or other suitable material, which shelves are adapted to support the egg-carrying trays 24 which may be of any suitable construction but which are preferably similar to those disclosed in my co-pending application, Serial No. 536,492, filed February 14, 1922, and entitled Apparatus for preserving eggs. The said trays 24 are provided with compartments 25 adapted to receive eggs 26 and to permit the lower portions of the said eggs to contact with the upper surfaces of the plates 23 in a manner similar to that disclosed in the said prior Patent No. 1,302,955.

As above stated there are two supporting members 8 and 9 located upon each of the side walls 5 and 6 of the container and there is a single supporting member 15 secured to the end wall 3, all of which are preferably located in substantially the positions shown. The plates or shelves 23 are slightly smaller than the interior dimensions of the receptacle 1 and one of the longer edges thereof is provided with the notches 26', which notches are of such dimensions as to readily clear the projecting lugs 10 of the supporting members 9. It thus results that when it is desired to insert a plate 23 within the container 1, the said plate may be slightly tilted with its uncut edge 27 down, as illustrated in Fig. 5, and the said plate lowered to the desired position within the container. As soon as this position is reached the said plate 23 may be moved laterally to cause its said edge 27 to engage the desired projections 10 upon the supporting members 8, whereupon the opposite edge 28 of the said plate may be lowered, the projections 10 of the supporting members 9 passing through the notches 26 with which the said edge 28 is provided. When the plate has assumed a level position the edge 29 thereof adjacent the end wall 3 of the container will contact with the inclined cam portion 17 of the supporting member 15 located upon the end wall 3, thereby causing the said plate to move longitudinally to the right as seen in Figs. 1 and 3, whereby the notches 26 are moved out of register with the projections 10 on the supporting members 9. This movement of course brings an uncut portion of the edge 28 over the projections 10 of the said members 9, whereby the said edge 28 may be supported. With the plate 23 in its level position, the edge 29 thereof will rest upon and be supported by the portion 21 of the supporting member 15. The said plates 23 may be provided with suitable openings 30 for the introduction of the fingers of the operator, whereby they may be suitably manipulated to introduce and be withdrawn, in the manner above disclosed.

With the plate 23 in position the frame or tray 24 is then placed within the container resting upon the said plate in a manner similar to that disclosed in the said prior Nichols patent.

In order to produce relative movement between the frames 24 and the plates 23, I have provided each of the said trays or frames with an eye or hook 31 which is adapted to engage one of the hook members 32 carried by a vertically disposed rod 33 to which is rigidly secured in any suitable manner a horizontally disposed rod 34 (see Figs. 3 and 4). The said rod 34 passes through the end wall 4 of the container and may be provided with a suitable stuffing box or gland 35 to provide a liquid-tight joint for the said rod. The end of the rod 34 which projects beyond the stuffing box may be provided with a handle or ring 36, whereby the said rod is adapted to be manually moved inwardly and outwardly, as the occasion demands. The plates 23 are provided with slots 37 to accommodate the vertically extending operating rod 33, as will be clear from Figs. 1 and 3.

A suitable drain opening 38 may be provided in one of the end walls such as 4 adjacent the bottom wall 2, whereby the preserving fluid may be withdrawn when desired, and the said drain opening may under normal conditions be closed by a plug member 39, as best shown in Fig. 2.

The operation of the apparatus is similar to that disclosed in the Nichols patent, and will be clear from the foregoing, but it may be briefly summarized as follows:

Assuming that the container 1 is empty, a plate 23 is introduced therein and lowered in the manner above disclosed to engage with the lowermost projections 10 of the supporting members 8 and 9. As the edge 28 thereof is lowered the edge 29 will contact with one of the cam surfaces 17 carried by the supporting member 15 and will force the said plate 23 to the right, as seen in Figs. 1 and 3, whereby the uncut portions of the said edge 28 may be caused to engage the supporting lugs 10 of the members 9. A frame or tray 24 containing the desired number of eggs may then be lowered into the container and permitted to rest upon the plate 23 which has been thus introduced, the eye 31 of the said tray engaging the up-turned hook 32 carried by the vertical operating rod 33. As many additional plates or trays may then be introduced successively into the container as may be necessary, whereupon the plug 39 being in place within the discharge passage 38 the container may be filled to a suitable level above the uppermost tray with the preserving fluid. The cover 7 may then be lowered and the entire container placed in storage. When it is desired to turn the eggs after a predetermined time, as disclosed in the said prior Patent No. 1,302,955, they may all be simultaneously rotated about their major axes by merely grasping the ring or handle 36 and pulling out thereon which, through the rods 34 and 33, the hooks 32 and 31 will cause the said trays to be moved in a longitudinal direction. The lowermost portions of the eggs contained in the said trays resting upon the upper surfaces of the plates 23, the said eggs will consequently be rotated and the yolks thereof preserved in substantially the central positions within the shells.

It is obvious that those skilled in the art may vary the details of construction as well as the arrangements of parts without departing from the spirit of the invention, and therefore it is not wished to be limited to the above disclosure except as may be required by the claims.

What I claim is:

1. In a device of the class described the combination with a receptacle having side and end walls, of supporting members carried by said side walls; readily removable plates adapted to be introduced into said receptacle, having cutaway portions through which said supporting members may pass; and means for automatically moving said plates to position said cut-away portions out of alinement with said members, whereby other portions of said plates may rest upon said members.

2. In a device of the class described the combination with a receptacle having side and end walls, of supporting members rigid with said side walls; readily removable plates adapted to be introduced into said receptacle, having cut-away portions adjacent the edges thereof through which said supporting members may pass; and means carried by one of said end walls for automatically moving said plates to position said cut-away portions out of alinement with said members, whereby other portions of said plates may rest upon said members.

3. In an apparatus of the class described the combination with a receptacle having side and end walls, of a plurality of substantially vertically disposed members secured to said walls, provided with angularly disposed supporting projections; readily removable plates adapted to be introduced into said receptacle, the edges thereof being provided with cut-away portions through which said projections may pass; and means carried by one of said end walls for moving said plates to position said cut-away portions out of alinement with said projections, whereby other portions of said plates may rest upon said projections.

4. In an apparatus of the class described the combination with a receptacle having side and end walls, of a plurality of substantially vertically disposed members secured to said walls, provided with angularly disposed supporting projections; readily removable plates adapted to be introduced into said receptacle, the edges thereof being provided with cut-away portions through which said projections may pass; and means comprising cam surfaces carried by one of said end walls for automatically moving said plates to position said cut-away portions out of alinement with said projections, whereby other portions of said plates may rest upon said projections.

5. An apparatus of the class described comprising a receptacle having side and end walls; a plurality of vertically disposed members rigid with said walls, provided with stamped angularly disposed supporting projections; readily removable plates adapted to be introduced into said receptacle, one of the edges of said plates being provided with notches adapted to register with said projections, whereby the latter may pass therethrough; and a vertically disposed member carried by one of said end walls provided with cam surfaces adapted to engage other edges of said plates to move the same, whereby said notches may be moved out of register with said projections.

6. An apparatus of the class described comprising a receptacle having side and end walls; a plurality of vertically disposed members rigid with said walls, provided with stamped angularly disposed supporting projections; readily removable plates adapted to be introduced into said receptacle, one of the edges of said plates being provided with notches adapted to register with said projections, whereby the latter may pass therethrough; a vertically disposed member carried by one of said end walls provided with cam surfaces adapted to engage other edges of said plates to move the same, whereby said notches may be moved out of register with said projections; and egg holding trays adapted to rest upon said plates.

7. An apparatus of the class described comprising a receptacle having side and end walls; a plurality of vertically disposed members rigid with said walls, provided with stamped angularly disposed supporting projections; readily removable plates adapted to be introduced into said receptacle, one of the edges of said plates being provided with notches adapted to register with said projections, whereby the latter may pass therethrough; a vertically disposed member carried by one of said end walls provided with cam surfaces adapted to engage other edges of said plates to move the same, whereby said notches may be moved out of register with said projections; egg holding trays adapted to rest upon said plates; and means for moving said trays relative to said plates.

In testimony whereof I affix my signature.

GEORGE H. BENEDICT.